(12) United States Patent
Bennett

(10) Patent No.: US 8,429,750 B2
(45) Date of Patent: Apr. 23, 2013

(54) SEARCH ENGINE WITH WEBPAGE RATING FEEDBACK BASED INTERNET SEARCH OPERATION

(75) Inventor: James D. Bennett, Hroznetin (CZ)

(73) Assignee: Enpulz, L.L.C., Chicago, IL (US)

( * ) Notice: Subject to any disclaimer, the term of this patent is extended or adjusted under 35 U.S.C. 154(b) by 923 days.

(21) Appl. No.: 12/433,561

(22) Filed: Apr. 30, 2009

(65) Prior Publication Data

US 2009/0216760 A1   Aug. 27, 2009

Related U.S. Application Data

(63) Continuation-in-part of application No. 11/847,094, filed on Aug. 29, 2007, now Pat. No. 8,055, 671.

(60) Provisional application No. 61/053,283, filed on May 15, 2008.

(51) Int. Cl.
*G06F 11/30* (2006.01)
*G06F 17/30* (2006.01)
*G08B 23/00* (2006.01)

(52) U.S. Cl.
USPC ............................. 726/25; 726/24; 707/726

(58) Field of Classification Search .............. 726/22–25; 707/723, 726, 706
See application file for complete search history.

(56) References Cited

U.S. PATENT DOCUMENTS

| | | | | |
|---|---|---|---|---|
| 7,562,222 B2 * | 7/2009 | Gasparini et al. | ............. | 713/170 |
| 7,562,304 B2 * | 7/2009 | Dixon et al. | ................... | 715/738 |
| 7,624,101 B2 * | 11/2009 | Lin et al. | ............................... | 1/1 |
| 8,095,967 B2 * | 1/2012 | Loesch et al. | ..................... | 726/5 |
| 8,108,383 B2 * | 1/2012 | Lin et al. | ....................... | 707/715 |
| 8,112,403 B2 * | 2/2012 | Repasi et al. | ................. | 707/705 |
| 2008/0005223 A1 * | 1/2008 | Flake et al. | ................... | 709/203 |

* cited by examiner

*Primary Examiner* — Zachary A Davis
(74) *Attorney, Agent, or Firm* — Garlick & Markison; Bruce E. Garlick

(57) ABSTRACT

The system and methods herein provide feedback of a web page quality/legitimacy factor, various user interaction parameters, a contact address correlation factor, and an explicit web page rating on the reverse path from the client to the severs for Internet search operations. This operation facilitates to improve the quality of websites/web pages and enhances the efficiency of the Internet search operation. This reverse communication also allows for the automatic blockage of any illegitimate websites due to poor "contact address correlation factor" and poor "web page quality factor." The rating of the websites is based on a computed number called "web page quality factor." The "web page quality factor" is communicated in the reverse path of Internet search operation back to various whois servers, domain registrars, and web servers on the Internet to further improve quality. This facilitates the filtering of scammers, squatters, illegal/unwanted sites, etc., which have low "web page quality factor" rating resulting in high efficiency of search operations.

19 Claims, 9 Drawing Sheets

SEARCH ENGINE WITH WEBPAGE RATING FEEDBACK BASED INTERNET SEARCH OPERATION

CROSS REFERENCES TO RELATED APPLICATIONS

The present application is a continuation-in-part of U.S. Utility application Ser. No. 11/847,094, filed Aug. 29, 2007 now U.S. Pat. No. 8,055,671. The present application also claims priority under 35 U.S.C. 119(e) to U.S. Provisional Application Ser. No. 61/053,283, filed May 15, 2008, and having a common title with the present application, both of which are incorporated herein by reference in their entirety for all purposes.

BACKGROUND

1. Technical Field

The present invention relates generally to Internet search operations that provide feedback on search result websites/ web pages web page search to a user.

2. Related Art

Business firms maintain business related registration on Internet databases. This information has to be in an up-to-date form/format to reflect timely changes that happen to the business. For example, the business must change its contact address, telephone, services/products provided, etc., as they change over time. Otherwise a customer or user doing the Internet search operation will obtain incorrect or misleading data when processing searches and conducting business over the Internet.

The current search engines do not take any measures to impose discipline on illegal websites and ensure only legitimate businesses are being presented to legitimate web users. Illegal websites are often unregistered or malicious websites that are progressively linked through some registered websites. However, such Universal Resource Locators (URLs) corresponding to unregistered websites appear on web pages from registered websites and are crawled during a search operation. Sometimes, illegitimate search results bubble to the top in the search result list, and often these results are not the results a user is looking for. Searching of critical information is not effective, desired, or used if it requires a lot of time spent in sifting through illegal or inappropriate sites that appear towards the top of the search list. Finally, the user may fail to hit right web page of a legitimate website, as such sites may be buried deep in the search result list.

Also, current search engines fail to detect or give any indication that a site detected may be a malicious, illegal, or undesirable website. Those websites are also a major source of malware, and therefore a risk to the integrity and safety of the client device or user information. Furthermore, some websites generate a lot of unsolicited spam, adware, spyware, and malicious code. Also, such web pages add to junk traffic and resource consumption on the Internet, severely impairing the effectiveness and speed of Internet search operations and other Internet operations (like streaming video, etc). There are no effective algorithms to protect against such websites when searching the Internet and the number of malicious content and websites is growing unabated day-to-day, making the scenario worse. Better search regulations and detection algorithms to detect and/or filter websites which have malicious contents make the Internet search highly contextual and useful for the user, as well as more efficient.

Millions of business-related information databases contain enormous information, providing access to valuable data to millions of users daily. It is hard to maintain such a huge number of databases in an up-to-date manner by way of tracking the changes that happen in the business front every minute of the day. It is a mammoth task for database management communities to actively track and make necessary changes to such database information manually or automatically. Yet, if timely changes are not made to such database content, millions of users, clients, customers and business groups lose their share of opportunities and business and their ability to provide users with accurate information in real time. In such adverse conditions, Internet squatters and scammers can further manipulate business at the cost of end user's or consumer's interest.

Address correlation is not checked in the current search engine algorithms during a search operation. This process would help make the search result more relevant to what a user is looking for. The address correlation needs to be done with a reliable database source on the Internet. In this database, legitimate business firms engage in registration for the proof of legitimacy of their contact information, and proof of registration can also appear on their websites/web pages. A measure of similarity between these address components is a very important piece of information needs to be communicated back to the business if there are any discrepancies. It is the responsibility of the business firm to update this component of information on its website/web page in case of any recent change that has occurred.

Most of the web pages link back and forth with each other with several of them potentially being illegal squatters. If a search string (or search term) hits some large number of websites during the search operation, each one of those often point to each other and most of them are illegal websites. These sites bubble to the top of the search list and these websites thus makes revenue illegally. Current search engines do not have any measure of quality of a web page or source, to enable a browser or web community to nail down and shutdown bad websites. Some web pages do not comply with certain norms on the Internet, and there are the websites on-line that simply add to Internet traffic during the search operation, but add no value to the end users.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
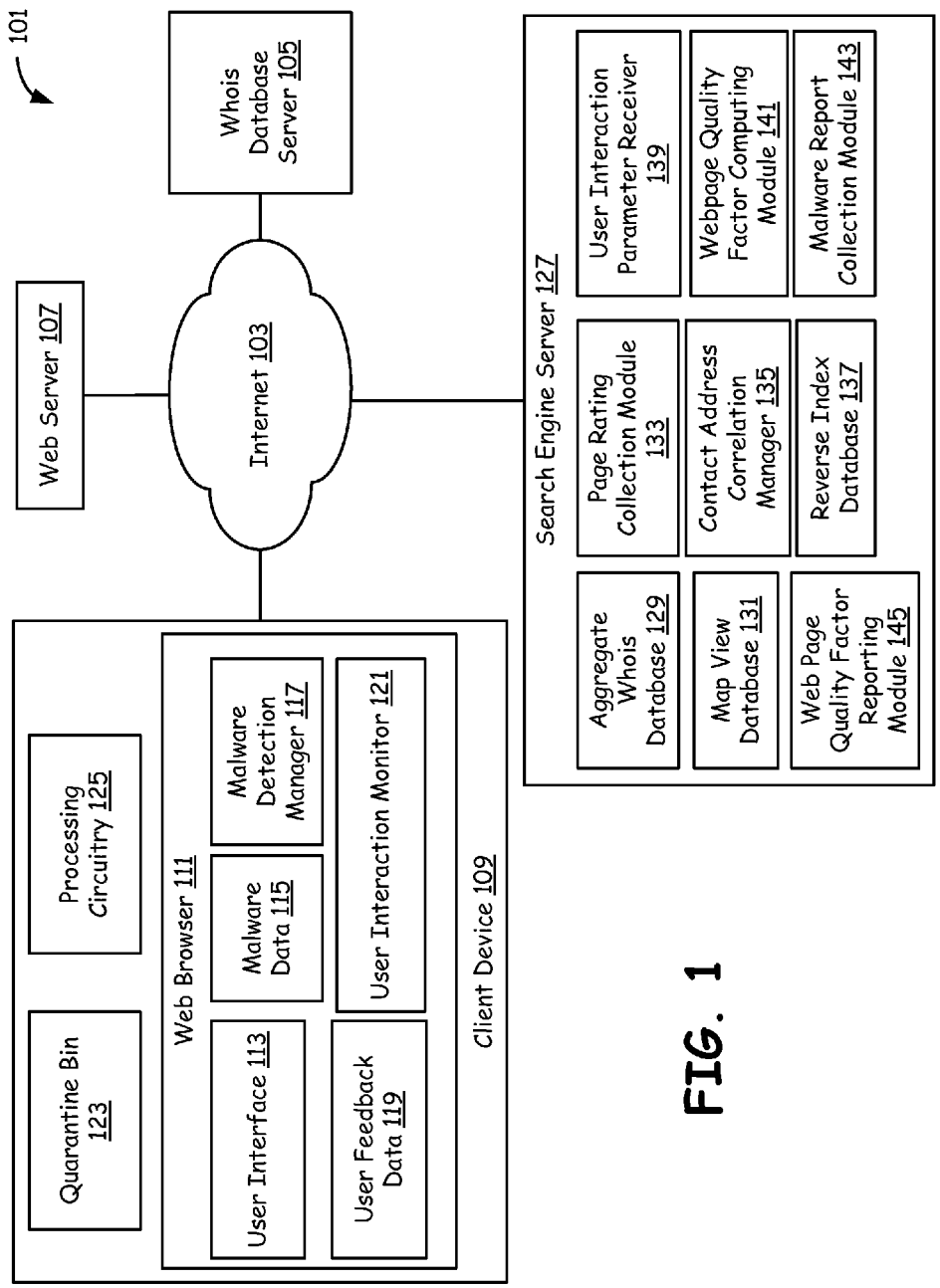
FIG. 1 is a block diagram illustrating the principle of feedback search operations with a reference whois database search engine using search region restriction to perform a contextual search.

FIG. 1 is a block diagram illustrating the principle of feedback search operations in conjunction with a reference whois database search engine with search region restrictions being provided to provide for a contextual search. Some business firms follow unsolicited ways of advertising through the Internet and other networks. For example, the business may use adware popups during the Internet search or browse operations. Normally, users do not want or feel like viewing those adware popups, as they are unsolicited and often annoying. Other problematic ways some websites use to attract traffic in unwanted ways are performed by Internet squatters that are linked to some other registered websites. These squatters intend to make quick revenue on the Internet through illegal ways, by squatting, or by attaching to legitimate web sites in inappropriate and deceptive ways. Such squatters often link to each other's websites to get search result priority artificially elevated, and in these cases, the squatter sites can often bubble to the top in the search result list.

Spyware enters client devices with the intent of understanding or inappropriately detecting the conduct or personal information of the user. For example, spyware has been used to monitor the Internet browsing habits of the user. Pooling of such statistics gives squatters and hackers a valuable inference on market trends. Some of the websites contain viruses that become dangerous during various Internet search and download operations, not only for the client device and user exposed to the virus, but for others over the Internet as well. A common term used for adware, spyware, viruses, spammers, etc., herein is the malware. Such websites that have, promulgate, or contain malware need to be rated low and subsequently be blocked in search operations performed by a client or user.

Whois databases, that are often maintained by different agencies (or service providers), are resident over the Internet and other related networks. Business firms approach whois database owners and operators and register their business firms, partnerships, proprietorships, personal businesses, services, corporations, etc, with the required information for the benefit of their customers. Such whois registrants are proven to be the legitimate owners/representatives of their website and business information. The whois database record(s) pertaining to a business firm have all pieces of information for the business put in distinct sections of a whois database record, which allows a company/business/firm to show up as legitimate firm. Contact address sections associated with whois information contain legitimate contact information of all forms for a business/organization, and generally include geographical contact address, telephone number, zip code, GPS coordinates, E-mail, etc.

It is the responsibility of the business firm to keep the contents of its whois database records up to date for all whois databases they use. Whois registration in a timely and updated manner helps to ensure that business' website/web pages are easily searched on the Internet. Herein, feedback is provided from the client device and the search engine server to the whois database server, and the system can easily identify if there are any discrepancies in the contact address between the registered company and the company the user thinks they are accessing over the Internet via a search. The whois database server administrator communicates with respective business firms and asks for the current contact information on periodic bases or via some other process. This updating is important if the business firm has relocated to a new geographical address, materially changed its business offerings, or there is any change in telephone number, etc. The business should strive to replace the respective old entries on the whois database record with current and accurate information.

Any discrepancy in the contact information can be discerned by correlating the contact address on the website with that of the whois database. A poor correlation is one of the indications of the illegitimacy of the website found in a search by the user, and businesses want to avoid false alarms in this process and therefore need to keep data current on whois databases. In such cases where discrepancies are detected, the whois database administrator can immediately call the business firm and ask them for their latest contact information or ask for modification of contact address on their website. A poor contact address correlation may also cause the business firm's URL to be dropped from the search result list, if the search engine is not confident enough with the contact address correlation factor. In this process, naturally any squatters and scammers will get filtered out, as they do not have legitimate whois database registration. Suppose the illegitimate URLs appear on some legitimate web page. When a user clicks such URLs, the search engine server performs a checking of contact address correlation with aggregate whois processes. If the URLs and resulting web site data content accessed seem to be illegitimate, the businesses are warned by sending a feedback message (and also warning message is displayed for user on the client device) or these sites may be blocked from being browsed further. Also error messages that pop up may enable the user to rate such pages very low so that they get completely blocked during the subsequent searches. Such searched web links with progressively scanning multiple web pages will be rated low by a search engine when the contact address correlation of successive web link accesses is lower than some allowed value.

User interaction parameters on a web page need to be monitored by a module called a "web page quality factor-computing module" whose output indicates the web page quality, called the "web page quality factor." In one embodiment, the web page quality factor is a number between 0 to 10, but other metrics can be used. User interaction parameters are a set of parameter that are automatically or manually sensed or monitored by a "user interaction module." A user gets connected with the user interaction module through an appropriate user interface. The user interaction parameters that are kept by the system include explicit web page rating(s), visit durations, duration between selections (of an important phrase, etc. on the current web page), link steps on a web page (progressively scanning multiple web pages), specific item selections made on web page, "Backward" button hit frequency, "Next" button hit frequency, etc. Other important information considered during the computation of the "web page quality factor" is the malware report generated by the malware detection manager or by the user, explicitly.

The malware report detects and identifies the presence of any malware in the web pages or associated web pages of a search result. A malware detection manager notifies the user with a message if any viruses and spyware (or other malware) are found. A user can decide on an "explicit web page rating" based on any warning messages on viruses and adware or his own opinion about the quality of the web page. Explicit web page ratings may also be a number between 0-10 and may be an input to "web page quality factor computing module," which further takes other inputs and computes the web page quality factor rating number between 0-10. In other embodiments, other numerical or non-numerical processes and ranges may be used for such calculations.

Once the web page quality factor rating number is computed in the search engine server, this number is communicated back to the various database servers that have provided inputs during the search operations. Reliable servers to include in these operations are the whois database servers that have provided the legitimate contact address information and the web server that is hosting the respective web page being searched. Quality factor ratings may also be communicated back to the client device or the device from which the user is performing the search operation and browsing the web page(s) (like a cell phone, PDA, laptop, gaming console, TV, etc).

When a whois server is informed of the web page quality factor rating information for a web page or URL, it is the whois server's responsibility to adjust this number based upon other data or to take other appropriate action. The whois database server administrator may communicate the information back to the concerned business firm. The business firm may then take care of improving or influencing a change in this number by editing their website/web page or their whois database record. And, illegitimate, malware-propagating, or low-quality squatters sites may be weeded out from the network.

The structure of a whois database record is constructed by arranging legitimate registration information provided by or for a business firm by the whois database service providers or administrators. The use of a standard format for furnishing information on a business firm assists in ensuring compatibility and the automated harvesting of the required pieces of information.

Block diagram 101 of FIG. 1 illustrates the principle of feedback search operations with a reference whois database based search engine. Client device 109, search engine server 127, whois database server 105, and web server 107 are communicatively coupled with each other via the Internet 103 or some other similar wireless, wireline, optical, package-based, or like network. The client device 109 is associated with web browser 111 in which the search engine is opened for performing the Internet search operations. The browser has other modules (made up of software, memory, and/or hardware) such as processing circuitry or CPU 125, quarantine bin 123 for quarantining the browsed web page during the search, if it contains any malware, etc. The quarantine bin 123 facilitates safe downloading when the user tries to download web contents, as malware infected or illegal/unwanted content, pages, or data are quarantined in this isolated and safe location.

The search engine is opened in the web browser 111. The web browser 111 contains a malware detection manager 117 for detecting the presence of malware during the Internet search, browse, and download operations. It can also detect viruses, adware, and spyware and warn the user on finding these malware codes, behaviors, or patterns embedded in the searched results list. When the user opens a web page from the search result list, any popup ads (adware, etc.), needs to be taken into account when he/she rates that web page (on a number scale between 0-10 or on some other scale or non-numeric metric). The user can also click a "malware report" button and report malware processing from a dropdown menu, the type of malware he/she found, or be warned by the search engine with a specific type of malware or corrective actions needed to avoid, isolate, or remove malware. The detection of malware by the malware detection manager 117 takes place by the comparison of the contents of the opened web page with a known virus bit sequence database maintained in the malware data 115, or the viruses may be found by running the content, data, executable code, drivers, etc in the downloaded content within a virtual and isolated machine within the quarantine bin 123 and/or manager 117 and using active processing to detect the operation and behavior of malware in a safe and isolated virtual execution environment within or associated with the client.

A user interface 113 provides the user with an interface to the web page opened in a search engine. The user interface 113 is initiated (or started) once the user clicks and opens a web page, content, or search result while searching. Simultaneous with this event, a user interaction monitor 121 is also started to record the events that are necessary for feedback related to this content, media, webpage, or other data, to qualify that material's authenticity, quality, and/or level of safety. The user interaction parameters monitored by the user interaction monitor 121 are discussed further in FIG. 4. User feedback data 119 may be captured by the web browser 111, forwarded, and/or stored for subsequent use.

The user interaction parameters are often communicated to the search engine server 127. A module called the user interaction parameter receiver 139 receives all or at least some the user interaction parameters generated or processed from the client device 109. A search engine server module called a web page rating collection module 133 collects the user entered "explicit web page rating" information. A search engine server module called a malware report collection module 143 collects the "malware report" communicated by the client device.

When the user selects the type of the malware he/she found on the web page from a dropdown menu (or when the client or server automatically detects its presence), the malware report is generated. In one embodiment of the present invention, an automated malware report will be generated by the malware detection manager 117. In another embodiment of the present invention, the presence of viruses and spyware are first brought to the attention of the user, who then does the subsequent selection from the dropdown menu to generate the "malware report" or augment the malware report data. The malware reporting feature is further discussed with respect to FIG. 2.

The contact address correlation manager 135 generates a correlation factor between the legitimate contact address stored/registered in the aggregate whois database 129 and an address detected/parsed from the web page. If there is much of dissimilarity between the legitimate contact address and the web page based contact address, the correlation will be poor. Dissimilarity is due to changes detected in contact address between the registered whois database server records and addresses in the search result or website/web page. If the address legitimately changes over time and these changes are made in both the whois database and on the website and search results identically or in a substantially similar manner, there is going to be maximum similarity and hence a maximum correlation factor derived by the system. In other cases, a lack of correlation may indicate deception or deceiving content/pages, like malicious websites trying to maintain similar appearances but very much unlikely to be exact as that from the aggregate whois database (legitimate) contact address. Such websites can be detected by noticing poor or doubtful level of correlation factors between registered legitimate content/identifiers and those found in the resulting search result webpage, and sites believed to be illegitimate will be identified as such, nailed down or limited in access, or blocked entirely and the legitimate content owner, authorities, and/or the perceived offender may be notified by contacting them on telephone, or e-mail addresses, with a notice/warning. The aggregate whois database 129 is generated on the search engine server by (a whois crawler), crawling across the entire Internet through plurality of whois database servers that maintain the registered database from different domain registrars (for e.g. .com, .net, .org, etc.) registered by companies/business firms.

The "web page quality factor" computing module 141 of the search engine server 127, receives several inputs that are generated from within the search engine server and those received from the client device, such as user interaction parameters which includes the user entered "explicit web page rating" (on a number scale from 0-10 or some other scale/method). Basically, through this mechanism, legitimate users are able to rank and rate websites and that information may be used to keep dangerous, unwanted, illegal, or other websites from access by unsuspecting legitimate users. Other user's interaction parameters are discussed per FIG. 4. Other inputs from the client device are the malware report, which is also further discussed in FIG. 4. The web page quality factor-computing module 141 generates a "web page quality factor" on a number scale by appropriately pooling all the individual inputs with some algorithm that may be weighted or unweighted. This number is a measure of the quality of the website/web page, which is sent as feedback to the different database servers of interest on the Internet using the "web page quality factor reporting module" 145. The servers may use this information to notify users, restrict access, and perform corrective measures, etc., when search operations are performed by many users across the Internet.

The database servers of concern are usually the whois database servers and the web server that is hosting the respective website/web page. The whois database server administration will use this information to make the contact address correlation better during the subsequent searches by asking the business firms to maintain proper correlation between the whois database records and that on the web page hosted on the web server in respective domains.

In one embodiment, it is a map-based search engine which displays the search results on the world map in a graphical, map-based, satellite photo, or like graphical interface. It maintains a plurality of databases called herein as map view database 131. This database includes, map databases (like Google map), GPS (Global Positioning System) database, satellite database. In another embodiment, the search results are presented in a textual form in one of the search engine windowpanes called a search list pane (pane 205, to be discussed in FIG. 2).

The web page quality factor rating number from module 141 is often also stored along with the corresponding web links in the reverse index database 137 for later reference. The web pages, when cached/stored, are also tagged with the web page quality factor rating number and other feedback inputs from the client device or users as metadata that can be used by servers, other users, or the system in general. This information from a previous search session/operation will also be displayed in the current search session. Any malware code that is detected by the client device 109 may be reported to malware report collection module 143 of the search engine server module 127.

Figure 2:
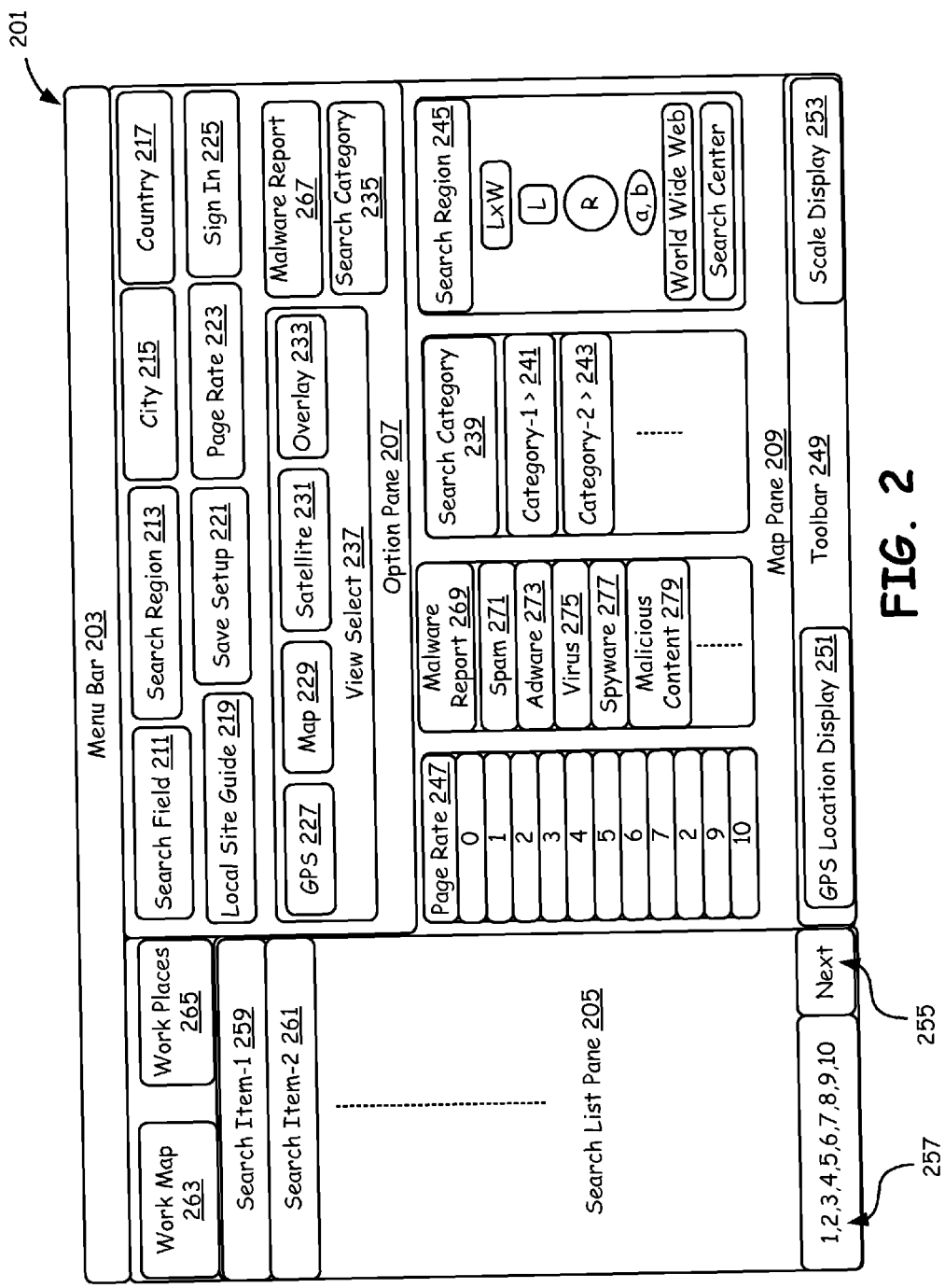
FIG. 2 is screen snapshot of a feedback operation search engine showing all the relevant buttons including explicit web page rating and malware report button in a search engine window.

FIG. 2 is screen snapshot 201 of a feedback operation search engine showing relevant buttons and the corresponding dropdown menus, in accordance with the teachings herein. An option pane 207 helps the user in selecting options for searching by choosing the view, search category, search region, etc., and other options. In a search list pane 205 the searched results 259, 261, etc., are displayed in the text form as group of ten results for page, or some other integer number N of pages as appropriate for the screen size/space available. A next ten or integer N results can be viewed using the "Next" button 255 or the integer results button 257 provided in the same pane 205. A prey button (not illustrated) for moving back to prior displayed search pages may also be provided.

A map pane 209 displays the selected graphical or topographical view of the map along with the search results displayed, tagged, or indicated thereon. Normally 10 (or an integer N of) search results can be conveniently displayed from the search list in the search list pane and on a map. In the map pane 209, a user can also setup views and mark his own tagged or mapped places and save them as his "work map" and "work places" for later reference and use. The menu bar has all the general purpose menus and items available for the user and the tool bar contains the tools for setting the right view on the map interface of FIG. 2, along with the display data, such as GPS coordinates and the current scale of the map, etc.

The snapshot diagram 201 of FIG. 2 is the screen snapshot of the search engine with web page ratings to enable feedback-based Internet search operation. The results that are listed in the search list pane are also displayed simultaneously on the world map pane, in one embodiment. Various search restrictions can be set by the user for a localized, geographically limited, and highly contextual search. Menu bar 203 contains all the menus commonly used in a network browser in which the search engine is opened. The search list pane 205 has all the search results listed in the order of their "web page quality factor," in one embodiment of the present invention. Other orders, like popularity, date, etc., can be used. The Search item-1 259, search item-2 261, etc., in the search list are ordered with a priority determined by an internal search criteria such as the frequency of the search string on the web page, popularity of the web page, etc., in accordance with another embodiment of the present invention. A bottom of the search list pane 205 contains the search list groups 257 with numbers assigned from 1 to 10 (or some other integer N as needed). Each page typically has 10 web links or some other appropriate integer N. The user can switch to the next group in the order by mouse clicking the "Next" button 255 or by clicking the page numbers in area 257, in whichever the order user wants. The search list pane 205 also includes some of the special buttons that facilitate a user to personalize the search items for later references. The work map 263 button is used to store the map; normally the user uses this button to add markers on the locations of his interest on the map for quick recall and searching later. Another useful button is the work places 265 button that facilitates the user to save his search results on the map to his favorites places list.

The option pane 207 enables the user to set settings of his choice on the map during the search session, and also, the settings can be stored and retrieved automatically during the login of later search session. In other words, the user(s) may save search profiles that they can store and recall later to instantly configure the search engine to an interface they desire. The search field 211 is the place where the user enters his search string for the search operation. Further, the user may enter the name of the city in the field 215, and the country in the field 217, if the user wants to do searching in some predefined locations or geographies on the map. The user provides the geographic or limited search regions and methods for the restricted search region using the button 213, which results in popping up of a search region menu 245 or a graphical user interface that the user can graphically plot search areas on a map or a like construct. From the search region menu 245 that is used in one embodiment, a user can select and assign various search regions such as World Wide Web, search (region) center, and various domain shapes such as a rectangle, square, circle, and ellipse. During this selection, again the user will be prompted to enter the dimensions of the selected search domains, such as length (L) and width (W) of the rectangle, side length of the square (L), radius (R) of the circle, major axis (a) and minor axis (b) of the ellipse, search center coordinates, etc. Then the user can assign these shapes to create area that are searched or blocked from the search.

The "sign in" button 225 enables a user to start a search session by allowing the user to login for the subscribed services. Once signed in, the user has access to all his previously subscribed services with his work map, work places, etc. From there, a user can pay and subscribe for the services or renew expiring services, etc. The user will also retrieve all his personalized work map 263 and work place 265 etc., settings from the previous search sessions, if desired. All the personalized setups can be saved after signing in, using the button save setup 221 for later retrieval.

Searching can be categorized using the search category 235 button. Upon mouse clicking this button, the system pops up a search category menu 239. Each of the search category items in the search category menu 239, such as category-1 241, category-2 243 etc., results in further sub menus (indicated by a small side arrow symbol on the screen, or some other mechanism), wherein the user can choose various subcategories; this makes the search highly contextual. The search category list contains exhaustive lists that classify scope and types of searches commonly used by a user, and these categories can be further expanded depending on the emergence of new categories.

When the user does the search region restricted search operation, for example over a city; the user can search for specific category of amenities or businesses in that location based on their needs. The local site guide button 219 facilitates this feature to the user, and allows the user to access the various locations of amenities/businesses offered by some of the service providers registered in that location (or site).

The view select sub-pane 237 facilitates the user to select the world map view options, communicated to the search engine server 127 of the FIG. 1. If the user has mouse clicked the GPS button 227, then the GPS location of the cursor point on the map will be shown in the bottom toolbar menu 249 on the GPS location display 251. The GPS coordinates are updated when the cursor moves from one location to next. The coordinates in terms of longitude and latitude of cursor point on the world map (view) are displayed on GPS location display 251, in the tool bar 249, in one embodiment. On one side of the toolbar 249, the world map display scale information 253 is provided in all the different zoom levels/possibilities.

Choosing map 229 options from the view select sub-pane 237 displays only the bare map (with political/state/county/country boundary information as appropriate). If user selects satellite view 231, the earth's satellite view will be superimposed on the world map. If user wants all the three view options viz., GPS 227, Map 229, and satellite 231 views to be superimposed, he/she can select the overlay button 233 by mouse clicking and mix views in a useful way.

During browsing a web page the malware detection manager 117 of FIG. 1 detects malware code within search result web pages and content, and uses this detection when generating a malware report. In the meantime, the system also displays real time warning messages to the user with the type of malware and dangers it is detecting. Upon this warning, if user responds by hitting the malware report button 267, a dropdown menu called "malware report" 269 pops up. From there, the user enters his observations on the malware contents on the current web page such as a spam, adware, virus, spyware, and malicious content. Other selections such as, adult content, offensive content, violent content, etc., can be added. The malware report generated by the user overrides or can augment the automatic malware report generated by the malware detection manager 117 of FIG. 1 on the client device and eventually communicated to search engine server 127 of FIG. 1.

Important user interaction parameters for overall web page rating is the "Explicit web page rating" which is performed/provided via a "page rating" button 223 that pops up a "page rate" dropdown menu 247 in FIG. 2. From the "page rate" dropdown menu 247 the user selects a number between 0-10 (or selects based on some other rating scheme), to rate the web page explicitly. From the client device this information is received into the search engine server module called the "web page rating collection module" 133 of FIG. 1.

Figure 3:
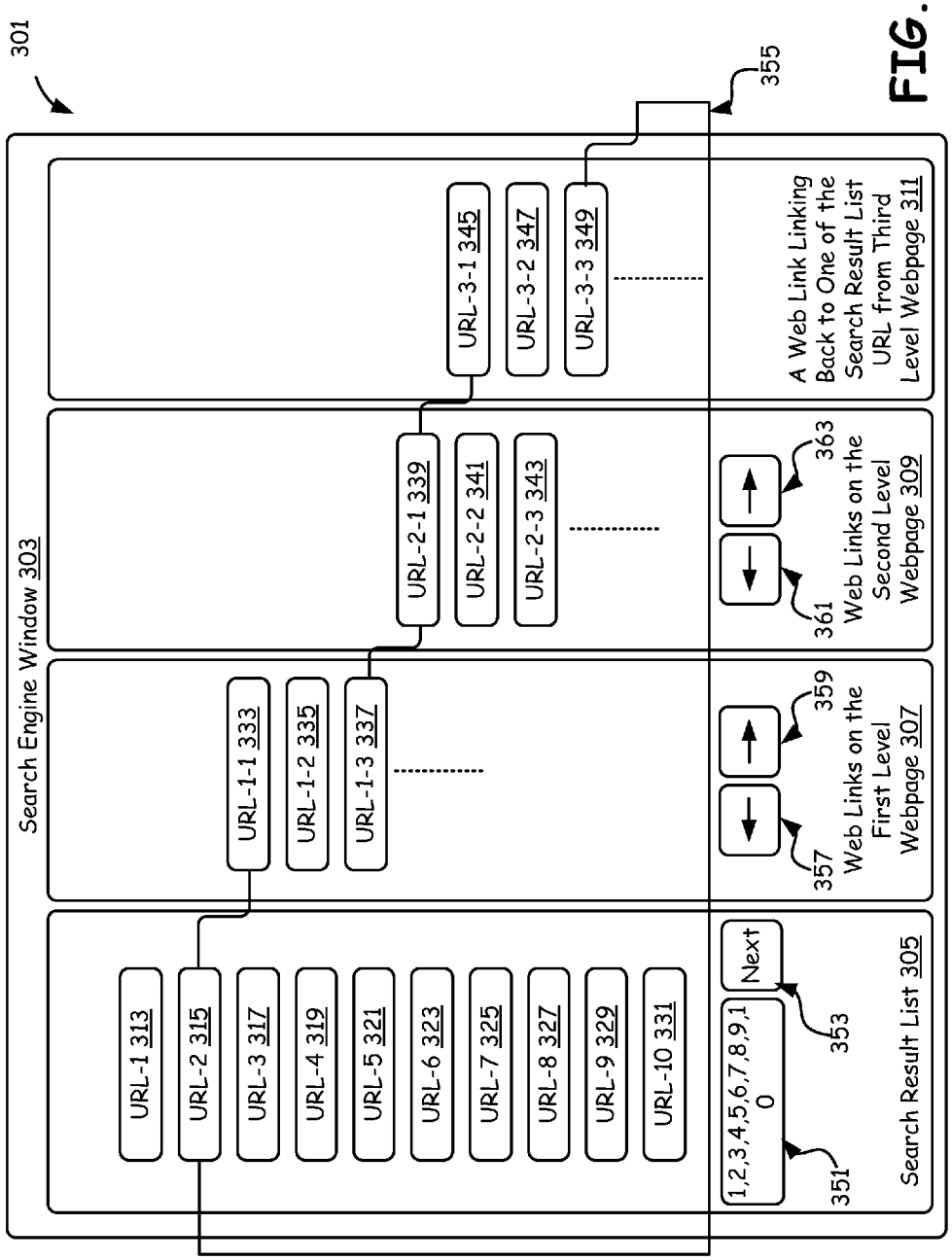
FIG. 3 is a set of successive screen snapshots illustrating the progressive scanning of the legal/illegal Universal Resource Locators (URLs) on a web page opened from the search result list.

FIG. 3 illustrates a set of successive screen snapshots that show the progressive scanning of the legal/illegal Universal Resource Locators (URLs) on a web page opened from the search result list, in accordance with one embodiment. The search results that are displayed in the search list pane 205 of FIG. 2 are considered to be legitimate URLs corresponding to the website/web page with authentic registration done both in the domain registrar and in the whois database servers. When some of the web pages from legitimate websites are opened they contain URLs that are progressively linked to illegitimate (or illegal) websites/web pages.

It becomes helpful to the user to check whether the URLs on legitimate web page are in turn legitimate as searching and browsing continue. When such URLs are clicked, the contact address correlation manager 135 of FIG. 1 determines the contact address correlation factor. If the contact address correlation is found to be low, such business firms corresponding to those URLs will not be opened, instead they are called (on telephone) or communicated (by e-mail, etc.) back and asked to make their contact address correlation better by updating their contact addresses on their website or in their whois database record. This may indicate an illegitimate website which needs policing or may indicate a legitimate web site that has experienced a temporary disconnect or error with respect to its registered business information/profile and the information provided on its website.

Each illegitimate URL on a legitimate web page leads to degradation of the web page quality factor of the web page opened from the search result list. A legitimate URL refers to those URLs that have legitimate domain name registration and also have whois database registration. URLs which have only one (either, on domain registrar or on whois database server) or no registration at all are not searched readily by the current search engine, as such websites are having poor contact address correlation factor and are being considered illegal/illegitimate websites. A user may override this protection and decide to allow access to illegitimate website via an override operation, however, this is often done with a warning notice to the user as illegitimate sites are identified and flagged/tagged.

A successive snapshot progression 301 of FIG. 3 shows the hierarchical levels of progressive web links on a searched web page. Apart from a search operation being categorized by the user using search category button 235 of FIG. 2 and the associated dropdown menu 239 of FIG. 2, contact address correlation requirements and geographical search region restrictions are imposed to make the search operation highly contextual for a given search string. The search result list 305 is presented to the user in the search engine window 303. Normally, they are presented as groups of 10 (or an integer N of) web links, as shown in FIG. 3 via search results 313 to 331, with other groups waiting to be displayed in subsequent page selections. Subsequent groups can be selected and opened by clicking any comma/page numbers from the button 351. Clicking "Next" button 353 opens comma-separated groups in the button 351 in a consecutive order.

When a user picks a URL arbitrarily, for example URL-2 315, from the search result list 305, the web page corresponding to that URL will get opened as first level web page 307 in the search engine window 303. The user will browse and interact through the current web page 307 and can follow URLs labeled as URLs 333 to 337 in FIG. 3. For instance if URL 337 is clicked, it may point to a second level web page 309 on the search engine window 303. The user will browse and interact with deeper levels of web content, further following links on this web page, such as links 339 to 343, to a third level webpage on the search engine window 311. The user will browse and interact with deeper levels of web content, further following links on this web page, such as links 345, 347, and 349. In such a hierarchical configuration of web pages with progressive links, each URL on a web page will point to each other. Also there are occasions where pointing from a deep level web page back to lower level web page can occur and circular paths can result. For example, a URL-3-3 345 on the third level webpage 311 may be pointing back to a URL-2 315 corresponding to a first level webpage 307, as illustrated by line 355. Such URLs which link from each other is a common ploy played by some unethical/illegitimate business firms so that their web links are favorable rated in search operations and always bubble to the top of the search result lists of most browser/search programs/algorithms. Such URLs may be legal or illegal, which is determined by the search engine server's "contact address correlation manager" 135 of FIG. 1. Illegal progressive URLs on a web page leads to poor "contact address correlation factor" with which it may fail to open on mouse clicking, if its value falls below a preset (or default) threshold/protection value. This in turn leads to a decrease in the "web page quality factor" of the URL that is followed from the search result list 305. Backward arrows 357 and 361 and forward arrows 359 and 363 from pages 307 and 309 respectively are used to navigate through web pages, back and forth, quickly.

Figure 4:
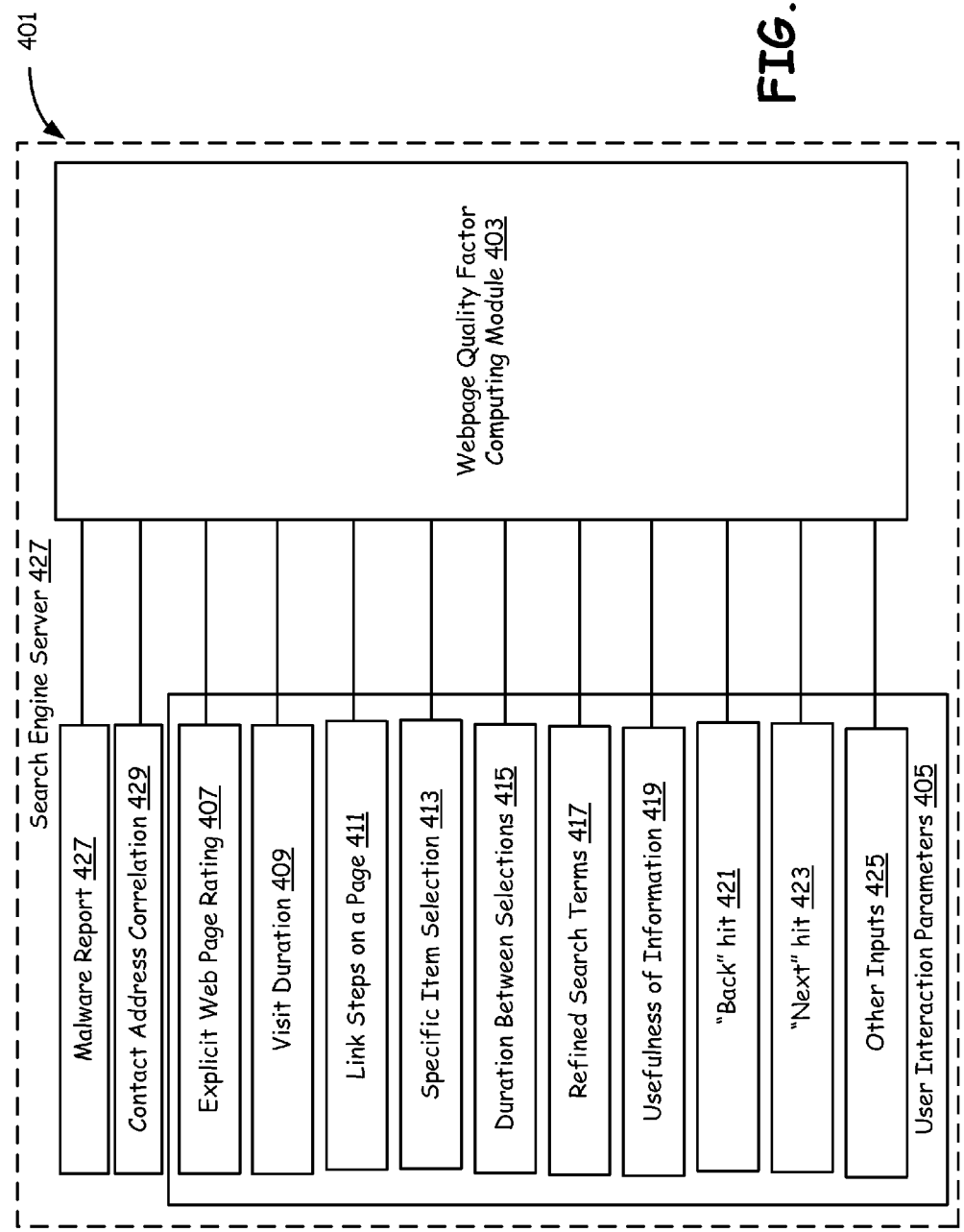
FIG. 4 is a block diagram illustrating the functional operation of a web page quality factor-computing module with all the relevant inputs.

FIG. 4 is a block diagram illustrating the functional operation of "web page quality factor" computing module 141 of FIG. 1 with the "user interaction parameters" 405 input coming from the client device along with the input coming from contact address correlation manager 135 of FIG. 1 (on search engine server). Another input is coming from the "malware detection manager" 117 of FIG. 1, as received from the client device 109. A helpful user interaction parameters is the "Explicit web page rating" 407 input selected from the Page rate button 233 and dropdown menu 247 of FIG. 2. This parameter is the user's opinion of the web page rated on a 0-10 number scale (or via some other algorithm and scale). From the client device, this information is received into the search engine server module called the "web page rating collection module" 133 of FIG. 1.

A malware report is generated when a web page is opened on the client device for browsing. Possible malware bit sequences are retrieved from search results and compared with an internal malware database 115 of FIG. 1 as the reference for comparison. Any malware code that is detected will be reported to the search engine server module called the "malware report collection module" 143 of FIG. 1. During this automatic detection of malware, a warning is generating to the user. Upon this warning, if a user responds by hitting the malware report button 267, a dropdown menu called "malware report" 269 pops up. From there, the user enters his observations on the malware contents on the current web page such as a spam 271, adware 273, virus 275, spyware 277, and malicious content 279 of FIG. 2. The malware report generated by the user can override or at least augment the automatic malware report generated by the malware detection manager 117 of FIG. 1 on the client device communicated to search engine server 127 of FIG. 1.

Other important parameters that are generated during the user's interaction with the web page are the visit duration, the duration for which a web page being visited. Another input is the "duration between selections" which is the duration for which an item, a phrase, an image, etc. are being selected. Yet another input is the "link steps on a web page," meaning number of levels of progressive links that are there on a searched and currently under browsing web page. The searched web page will be rated low, if the progressive links that are there on it are illegal. And, in theory, a site that is low quality, illegal, uninteresting to a user, or irritating will be visited for only a short time, visited only once, not interacted with for very long, etc. These user-interface patterns can be interpreted as an indication of a lower quality/value site by the system. In the reverse, a site on which a user spends significant time is of value to that user and his profile of interest.

A "specific item selection" on a web page like contact address, telephone numbers, etc. are considered to have significant importance. When user selects such items on the web page, it shows that the users are more interested in exploring the contents and other aspects of the web page. The other aspects includes, the user trying to contact the company or the business firm to whom the web page belongs to, for some more specific information or for specific category of services that company provides, etc. Interest is also shown by the user engaging in a registration operation, commencing a credit card payment, or giving other data to the web site of interest. The frequency of "backward" arrow hits and the "forward" arrow hits on a currently opened web page or on any of the progressive links on it indicates that the user has performed fast browsing without dwelling for much time on the searched web page or on any of the progressive links (URLs) on it.

Block diagram 401 of FIG. 4 illustrates the computation of web page quality factor rating number(s) that are used to provide feedback on the reverse path of Internet search operation, helping to facilitate the improvement of the web page quality factor of the web pages and their contents. The reverse path of Internet search operation is the path opposite of data flow on the Internet during the search operation. Therefore, reverse path information is destined back to those servers which sourced web page or search content (e.g., web servers 107 of FIG. 1) or the necessary pieces of information (for e.g. legitimate contact addresses) required for a successful search of the respective web page (such as whois database server 105, of FIG. 1) on the Internet.

The search engine server 427 (analogous to server 127 of FIG. 1 repeated) has a web page quality factor-computing module 403 (analogous to module 141 of FIG. 1 repeated). It receives the contact address correlation information 429 generated by the contact address correlation manager 135 of FIG. 1. It also receives user-entered malware input or automatic reports from malware detection manager 117 of FIG. 1 via the generated malware report 428 as provided as an input to the module 403.

The user interaction parameter includes explicit web page rating information 407, visit duration 409, duration between selections 415, link steps on a web page 411, specific item selection 413, refined search terms 417, usefulness of information 419, "Backward" arrow hit frequency input 421, "Forward" arrow hit frequency input 423, and other inputs 425. All these inputs to the web page quality factor-computing module 403 may be used internally in an algorithm that computes the web page quality factor. The specific information and algorithms, weighted or unweighted, may be tuned by IT professionals on the web or can be set/changed by users that weigh certain information more than others. In one embodiment, the web page quality factor which is sent in the reverse path is also accompanied with malware report 428, contact address correlation 429, explicit web page rating 407, etc. Basically, the database administrators of different servers and content/service providers review this information to discern flaws in the web pages and their contents, and then advise the business firms or various authorities to improve them and reduce illegitimate content on the Internet.

Figure 5:
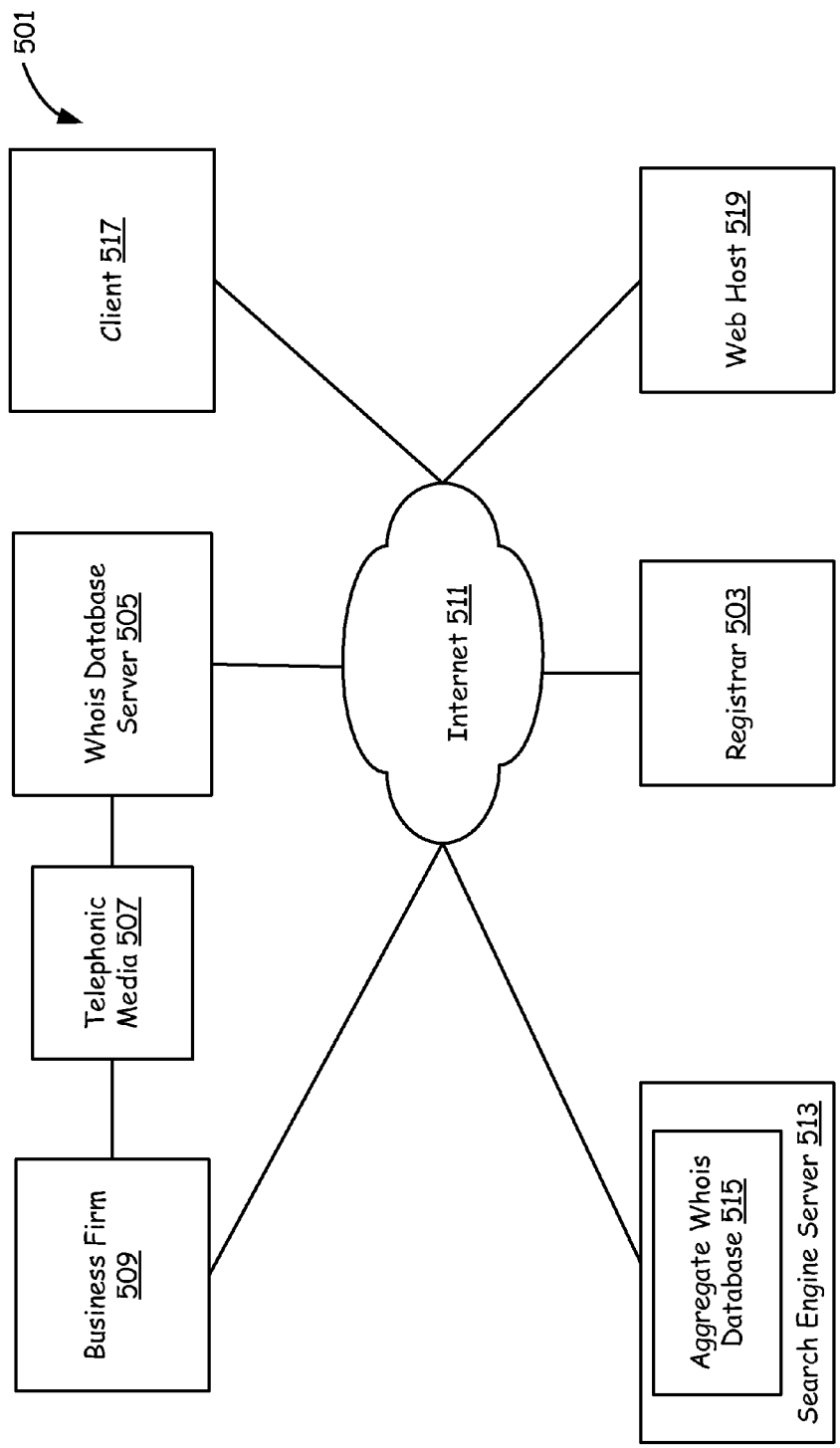
FIG. 5 is a block diagram illustrating the operations performed by the search engine server for the feedback of web page quality factors, malware reports, and user interaction parameters for evaluating and improving the quality of a website/web page.

FIG. 5 is a block diagram illustrating the operation of a search engine server to process the feedback of web page quality factor, malware report, and user interaction parameters in the reverse path of Internet search operation. This information is processed for evaluating and improving the quality of website/web page over time and reducing the negative impact of illegal or illegitimate content on the Internet. Human intervention becomes inevitable in certain contexts to make the databases or the websites/web pages up to date. When a discrepancy in a legitimate contact address is detected through poor "contact address correlation factor," respective business firms needs to be informed of this situation so the misinterpretation of data on the Internet is reduced and corrected. In response to this, it is the responsibility of the business firm to communicate the latest contact address to whois database and also update web page contact address on their web pages and ensure the two changes are done in close proximity to each other to minimize the time of disconnects between the two events.

The block diagram 501 of FIG. 5 illustrates the operation of search engine server 513 (analogous to server 127 of FIG. 1 repeated) for processing the feedback of "web page quality factor," malware report, contact address correlation factor, and user interaction parameters in the reverse path of Internet search operation. The search engine server 513 (analogous to server 127 of FIG. 1 repeated) has an aggregate whois database 515 (analogous to database 129 of FIG. 1 repeated) that is the aggregate of all the whois information (records) that is crawled from a plurality of whois database servers on the Internet 511 (analogous to Internet 103 of FIG. 1 repeated). This database needs to be updated periodically to reflect any changes that occur in the legitimate contact address in the whois database servers. The contact address component of the whois database server record is considered as "legitimate contact address," as this address is the reference information during the computation of the "contact address correlation factor."

The search engine server 513 is communicatively coupled to whois database servers 505 (analogous to server 105 of FIG. 1 repeated), client device 517 (analogous to device 109 of FIG. 1 repeated), web hosts (server) 519 (analogous to server 107 of FIG. 1 repeated), business firm's client device 509, and registration system (domain registrar) 503 via Internet 511 (analogous to Internet 103 of FIG. 1 repeated). When the contact address correlation factor is poor for the web page of a particular business firm, one or more whois database service providers will contact that business firm and ask for modification of the contact address in the whois database record, in their web page, or both. This can either be done via E-mail, electronically via a secure connection, or offline communication 507 such as telephone. The business firm then takes necessary steps to update their web page or whois database record, or to address any illegitimate content issues they may have with their URLs.

Figure 6:
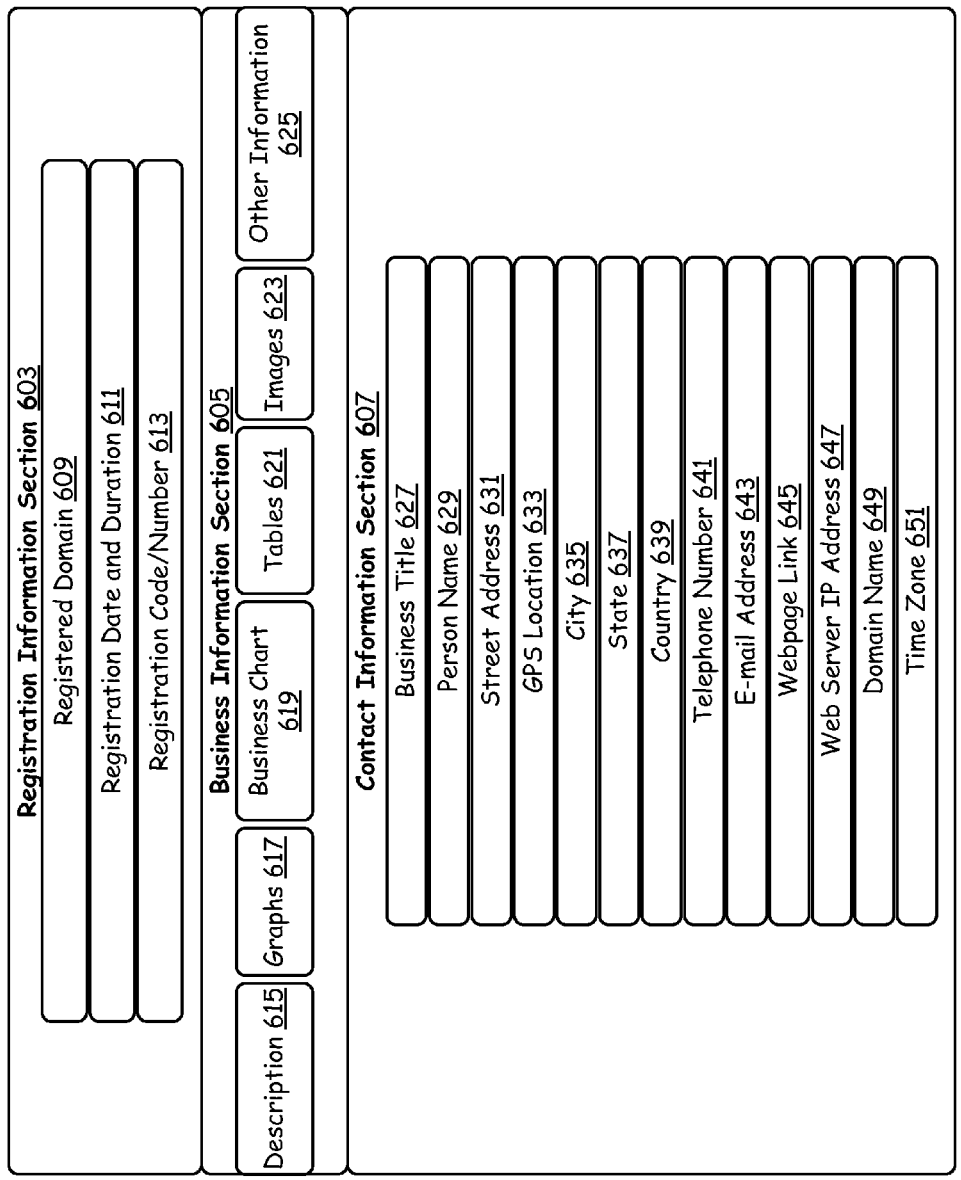
FIG. 6 is a screen snapshot of a whois database record of a business firm, including a contact information section that will be harvested (or crawled) into the aggregate whois database on the search engine server.

FIG. 6 is a screen snapshot of a whois database record of a business firm, from which a contact information section will be harvested (crawled) for placement into the aggregate whois database on the search engine server, as taught herein. It will be easier to harvest specific piece of information from a business firm's record, if the format of the records is a standardized form. In one embodiment, the whois database record is conveniently divided into three sections: a registration information section, a business information section, and a contact information section.

The registration information section 603 has all the necessary details regarding the registration of a website/web page in the whois database server. The registration information has their website registration domain information, registration date and duration, and registration code/number. The registered domain 609 is the domain type/name in which the business firm's website is registered, such as .net, .com, etc. The whois registration for a business firm is done for a specific duration that starts from the date of registration. Each of the whois database registrations is identified by a registration code or a number within the system.

The Business information section 605 contains all the business specific information for a given business firm, partnership, sole proprietorship, individual, corporation, etc. It has business description, business data in the form graphs, charts, table, etc., images of the product/services offered by the business, etc., and with other relevant information. If the business firm feels that certain items are confidential they can refrain from publishing details on those items.

The contact information section 607 is a useful section from the perspective of the search engine server of the present invention, because the contact address correlation factor/number computation depends on the contents of this section as one of the reference pieces of information. For the business form's website to be crawled during a search operation this factor/number or other correlation numbers/processes needs to be computed. This section includes the business title, person's name, street address, GPS location (if available), city name, state, country, telephone number, e-mail address, and web address/link (URL). Other optional information includes a web server's IP (Internet protocol) address, domain name, and time zone.

Screen snapshot 601 of FIG. 6 illustrates various sections of a whois database record in accordance with the present invention. It has three main sections: registration information section 603, business information section 605, and contact information section 607.

The registration section 603 has registration domain details 609, in which the website of a business firm is registered. It has registration date and duration information 611. The registration duration 611 is a period of validity of the registration. The valid period often starts from the date of the registration. The registration code/number 613 is a unique code/number identifying the registration of the business firm on the whois database server. Often, instead of calculating correlation data and determining legitimacy or illegitimacy via contact address information alone, registration codes such as 613 may be used. For example, assume the business can register an encrypted and secure key with a central security server. Then, the businesses web site and web pages may be programmed to contain this encrypted or secure key as well. Therefore, every time a business URL is accessed, the browser can match the encrypted security key that is registered with the watermark security key on the site and ensure authenticity. Further, algorithms exist for secure ID logging into restricted accounts. In these cases, a signature analyzer algorithm and core number is used to program a computer to cycle through numbers in a certain seemingly random sequence, say 884930, 220394, 444930, ever few seconds or so. If both the who is server and the website of user-searched interest contain the same sequence of changing secure IDs over time, then authenticity is shown. Therefore, in addition to simple text based address checking, which can be thwarted by some illegitimate web sites, more secure and foolproof security measures to ensure authenticity can be put in place using the teachings herein.

The business information section 605 contains, business description 615, textually. Other business details are projected in the form of graphs 617, business chart 619, and table 621. Product details can also be portrayed using their images 623. Miscellaneous information is furnished as other information 625 in FIG. 6.

The contact address section 607 has all the legitimate contact address details for the business. It consists of business title 627, an "in-charge" person's name 629, street address 631, GPS location information 633, city name 635, state name 637, country name 639, as well as other possible business information. Apart from this is the telephone number 641, e-mail address 643, and web page link (URL) 645. Other optional details are web server's IP 647, domain name information 649, and time zone information 651. Time zone 651 information is useful to know the working hours of the business firm.

Figure 7:
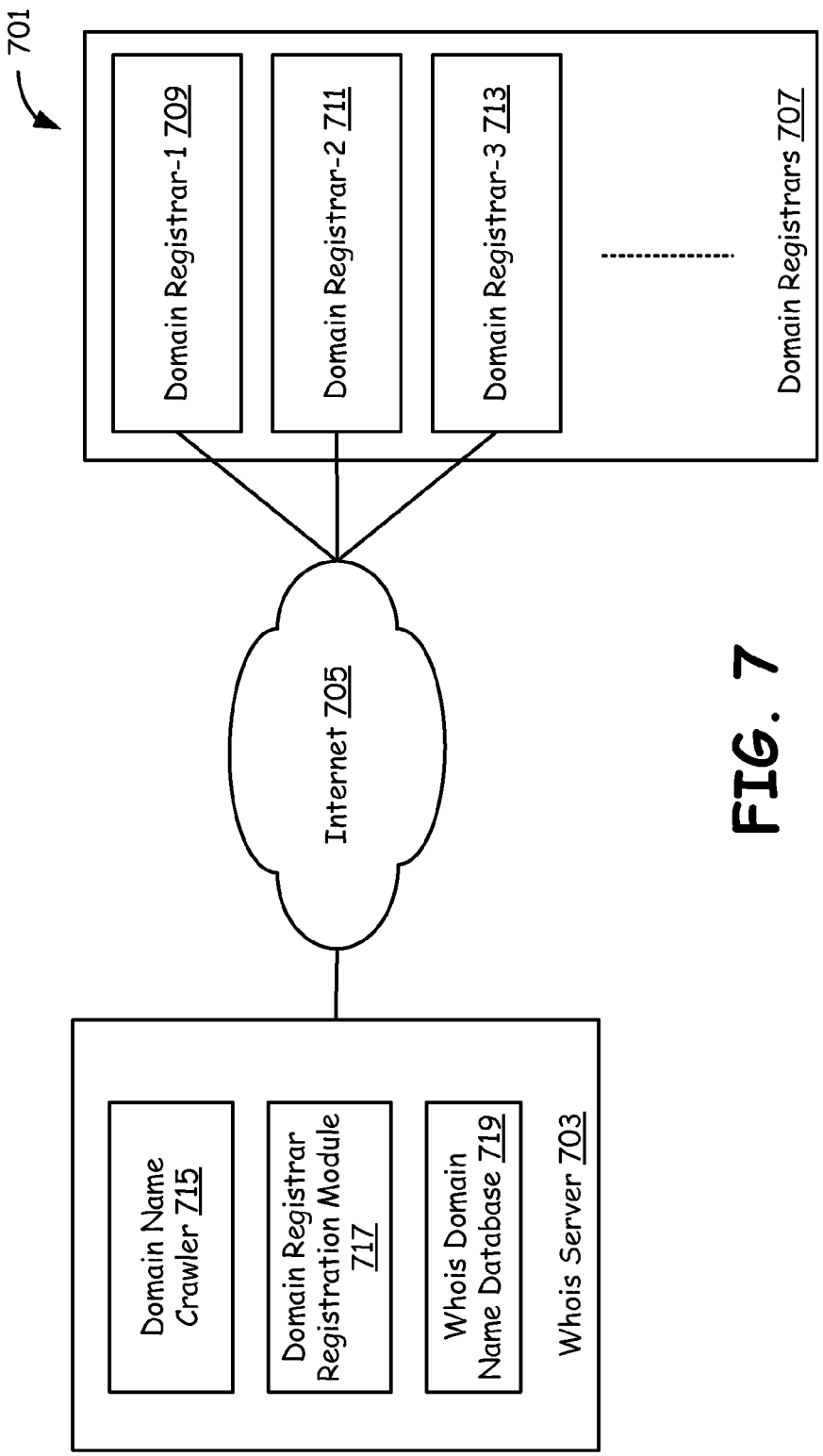
FIG. 7 is a block diagram illustrating the interaction of a whois database server with domain registrars for automatic harvesting of registration information.

FIG. 7 is a block diagram illustrating the interaction of a whois database server with domain name registrars to enable the automatic harvesting of registration information (i.e. to generate the records of FIG. 6) via one or more whois databases. The domain name registrar does web hosting for their customers on their web servers. The registrars have all the WHOIS information of a business firms who have registered on their servers. This kind of registration is obviously one level lower than the registration done at whois server levels. This is due to the fact that they provide for domain specific (for e.g., a .com, a .net, or a .org), registration.

As the Internet searches are not restricted to any domain in general, it becomes desirable to aggregate all the domain registration information to a higher-level database, such as whois database servers, which are introduced herein. The process of aggregating of all the registration information is best done on an automated basis to avoid the slowness and errors that can occur when a human is performing this task. This automation can be accomplished through the use of automated computer crawlers, which can collect all the registration information in their entirety or collect essential pieces of information to form or complete the record (format) as shown in FIG. 6.

Block diagram 701 of FIG. 7 illustrates a whois server 703 (analogous to server 127 of FIG. 1 repeated), communicatively coupled to a plurality 707 of domain registrars 709-713 via the Internet 705 (analogous to Internet 103 of FIG. 1 repeated). A domain name crawler 715 of whois server 703 crawls all the domain registrar databases. By crawling these databases, the domain name crawler 715 collects "whois" information from each of the domain registrars from 709 to 713.

In one embodiment, during the crawling process, the domain name crawler 715 harvests specific, useful, and/or essential pieces of information from the network, such as those illustrated in FIG. 6. The collected information during the crawl is aggregated into a whois domain name database 719. The domain name crawler 715 of FIG. 7 crawls only those domains which have completed prior registration in the "domain registrar registration module" 717 of the whois server 703.

Figure 8:
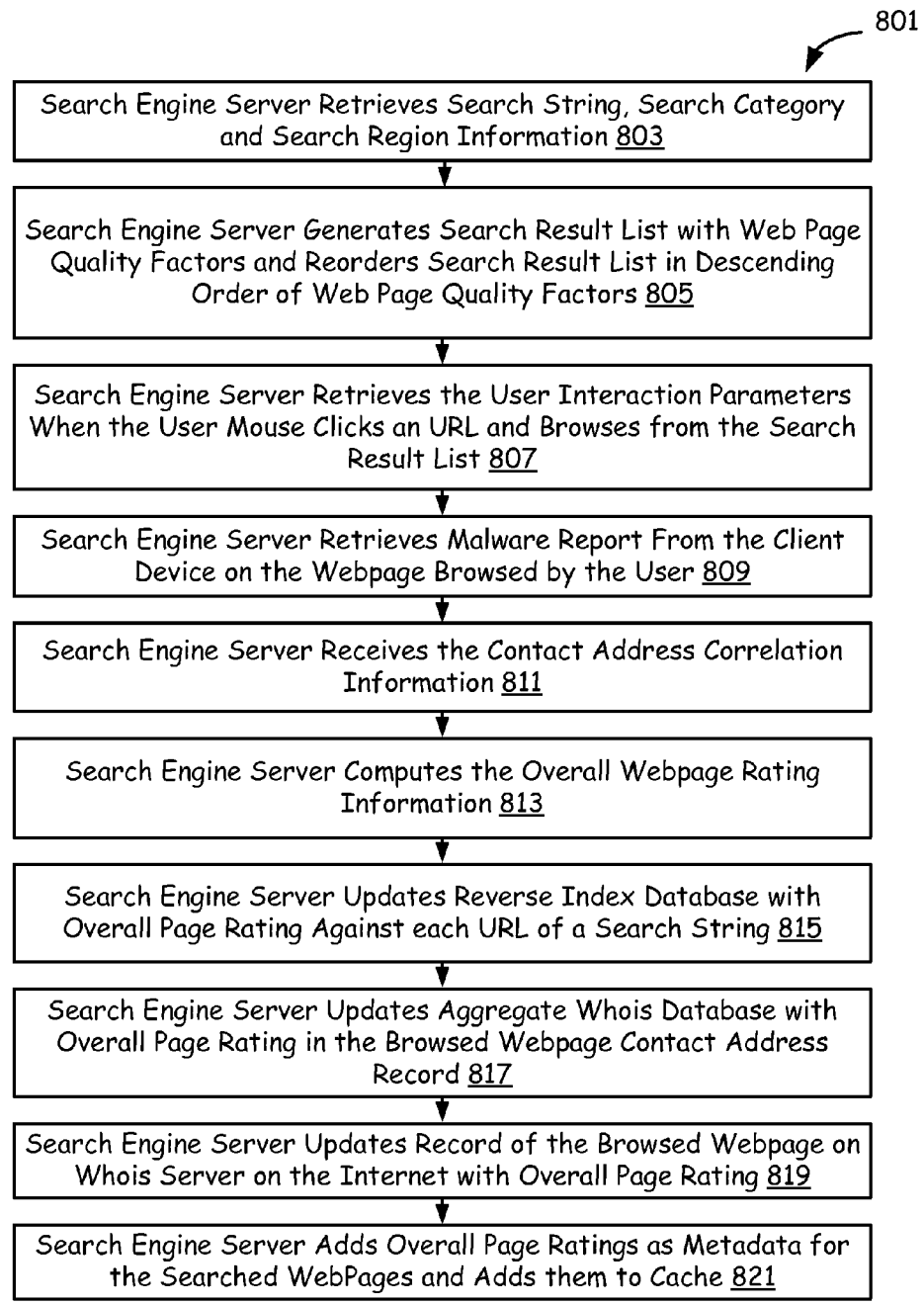
FIG. 8 is flowchart illustrating the operations performed by the search engine server in order to perform the gathering of malware reports, contact address correlation factors and web page quality factors, etc., to feedback in the reverse path of Internet search operation.

FIG. 8 is a flowchart illustrating the operations performed by the search engine server when gathering and presenting the malware report, contact address correlation factor, and web page quality factor, etc., for the feedback in the reverse path of Internet search operation. The search engine server receives the user entered search string, search category, and search region information from the client device in FIG. 1. In response to this user-entered information, it generates search results from within the search region selected from a search region dropdown menu 245 of FIG. 2 (or other methods), by the user. The selected search region, as discussed in FIG. 2, can be the World Wide Web, a centered search region, a search domain shape in the form of a rectangle, a square, a circle, an ellipse, with their dimensions provided by the user, or is defined in another manner by the user.

When search results are presented to the user in a textual window or on the world map search region window (as selected by the user), user clicks the search items of his choice from the search list and start browsing. This event trigger the "user interaction monitor" 121 of FIG. 1, which monitors and extracts the user's interaction from the currently opened web page as discussed via FIG. 4. All the user's interaction parameters that are monitored and extracted are discussed in FIG. 4 in greater detail. One of the important user's interaction parameter herein is the "explicit web page rate" input 407 of FIG. 4, a rating number selected from a page rate 247 dropdown menu in response to clicking of "page rate" button 223 in FIG. 2.

The search engine server receives the malware report from the client device as taught herein. This malware report may be user-entered and influenced and/or the malware detection manager 117 of FIG. 1 may generate it automatically. If a user enters this report explicitly or contributed to the automatically generated report, the one generated by the malware detection manager 117 will be overridden by the user entered data, in one embodiment. In other embodiments, other priorities can be assigned. The contact address correlation manager 135 of FIG. 1 computes the contact address correlation factor.

After taking all the inputs of user's interaction parameters, malware report, and contact address correlation factor, the web page quality factor computing module 403 of FIG. 4 computes the web page quality factor, a number from 0-10 (or some other numerical or non-numerical indicator), according to the teachings herein. Upon computing the web page quality factor, the search engine server updates the reverse index database 137 and the aggregate whois database 129 of FIG. 1 with the web page quality factor and other important numbers computed or monitored during this process in association with the respective URLs.

Subsequently, all the monitored and computed numbers are communicated back in the reverse path of Internet search operation to update any relevant database server information, such as that retained in the plurality of the whois database servers and the plurality of the domain registrar databases. The availability of this information to the relevant modules on these servers or to these personnel will enable the respective data records to be corrected or updated. In the meantime, those web pages that are cached in the search path are also augmented by computed web page quality factor and the monitored user's interaction parameters, etc., as metadata, thereby making it to be available for the subsequent search operations.

Flowchart 801 of FIG. 8 illustrates the method of operation performed by the search engine server during an Internet search operation using the principles taught herein Search engine server retrieves the search string, search category, and the search region information at a block/step 803 of the flowchart 801. In response to user inputs, search engine server generates a search result list. Each item in the search result list is associated with the web page quality factor(s) computed during the previous search operation. The search results are displayed by reordering of the search result list in the descending order of the web page quality factor at block/step 805, or via some other priority.

Search engine server 127 of FIG. 1 retrieves various user interaction parameters as discussed per FIG. 4 when the user clicks a search item and starts browsing at block/step 807. In addition to this, a malware report that is generated in the client device during the browsing operation is communicated back to the search engine server at block/step 809. The search engine server computes the contact address correlation factor at block/step 811 using the contact address correlation manager 135 of FIG. 1. Subsequently, it computes the web page quality factor at block/step 813 using the user's interaction parameters, malware report, and contact address correlation factor inputs. Next, the search engine server updates the aggregate whois database and the reverse index database with all the computed and monitored parameter values at blocks/steps 815 and 817 of the flowchart 801.

Upon computing the web page quality factor, the search engine server 127 of FIG. 1 communicates all the computed and monitored user's interaction parameter values in the reverse path of Internet search operation. The database servers that are addressed in the reverse path are at least the whois database servers and the domain registrars, whose databases are updated with currently computed and monitored parameters values at block/step 819. The same information is also made available as metadata tagged with the web page stored in the cache servers at a block/step 821.

Figure 9:
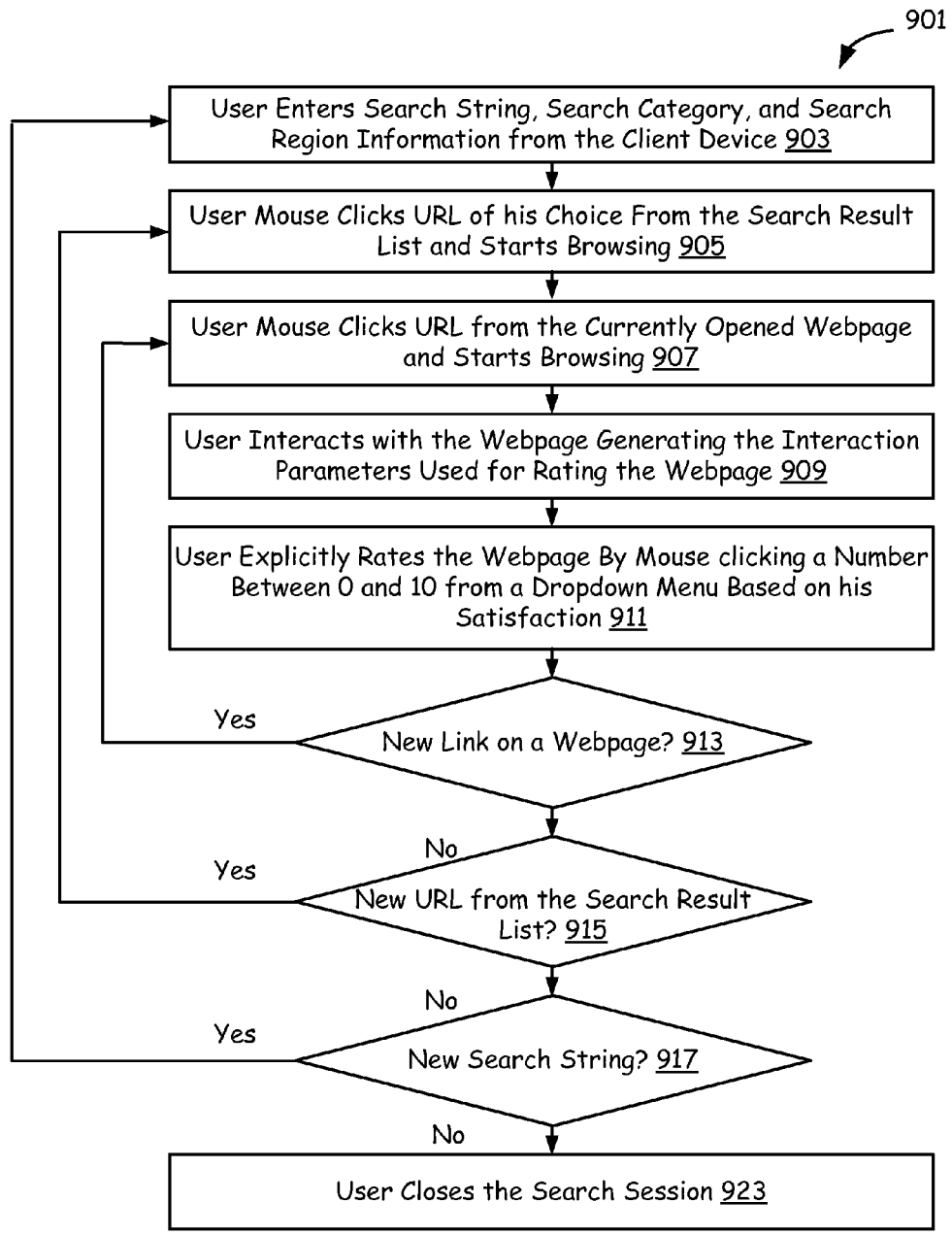
FIG. 9 is a flowchart illustrating the sequence of actions performed by a user in order to provide feedback of malware reports, contact address correlation factors, and web page quality factors in the reverse path of Internet search operation.

FIG. 9 is a flowchart illustrating the sequence of actions/operations performed by a user resulting in the feedback of the essential information in the reverse path of Internet search operation, in accordance the teachings herein. The user performs the following sequence of actions in using a "Search engine with web page rating feedback based Internet search operation." The Internet search operation starts with the user starting the search engine in the network (or web) browser. For some customized Internet search operation, the users need to log in to their personal accounts.

In the search field of the search engine window, the user enters the search string and selects the search category, and search region information from the dropdown menus 239 and 245 respectively from FIG. 2. In response to this entry, the search engine generates the search results and displays them in a textual and/or a world map window (in the map based search engine) pane as shown in FIG. 2. Then user clicks a search item of his/her choice and browses the web page. In response to this action a user interaction monitor 121 of FIG. 1 will begin operation and will start monitoring the user's interaction parameters that are defined and explained in the context of FIG. 4. The user follows progressive links on the current web page during the browsing, using "backward" and "forward" arrows for a quicker browse operation. All the parameters that are generated during the browsing operations are used for computing the web page quality factor using the "web page quality factor computing module" 403 of FIG. 4.

During the browsing of the web page, the user explicitly rates the web page quality and its contents, using the button page rate 223 and the page rate dropdown menu 247 and of FIG. 2. If there are any malware related popup warnings during the web page browsing, user can proceed to rate the web page explicitly in terms of the type of malware contents. He can click "malware report" button 267 to open a malware report dropdown menu 269 of FIG. 2 and from there he/she selects spam, adware, virus, spyware, or any other malicious content items and generate the malware report.

On a web page, user can decide to whether he can follow a new link on the web page i.e. progressive links or URLs on the current web page. The user can decide to select new URL item from the search result list or altogether try a modified or different search string or to repeat the whole sequence of operation mentioned. Finally, a user can end the session (by logging out) or by closing the search engine or network browser.

Flowchart 901 of FIG. 9 illustrates the sequence of actions performed by a user resulting in the feedback of the essential information in the reverse path of Internet search operation. The user starts the search engine from the network browser window and starts the search session (by logging in, if it's a customized search operation) at a block/step 903. He enters the search string, search category, and the search region (for a world map based search operation) from the client device at a block/step 903 of the flowchart 901. In response to this step, the search engine generates the search result list and displays them in the textual pane 205 or on the world map pane 209 of FIG. 2. From there user click the URL of his choice and starts browsing at a block/step 905. Further, the user follows the progressive URLs on the current web page by clicking of each of the progressive URLs (see FIG. 3). The search engine server does the computation of the contact address correlation and generates the malware report as a step to qualify that URL for its legitimacy. These steps are performed as the web site URL(s) is/are clicked at block/steps 905-909 of the flowchart 901.

As the user continues interacting with the searched web page the "user interaction parameter" are generated automatically by the "user interaction monitor" module 121 of FIG. 1, and the user may add his explicit rating at the block/step 911 of the flowchart 901. In other words, after auto tracking of user interaction and computer generation of some correlations of legitimacy by the servers or clients, the user further responds by generating the explicit web page rating at a block/step 911 and generating the malware report at the block/step 911. The user decides whether to follows progressive links at the decision box 913, and if "yes," the method goes back to the block/step 907 and repeats the operations again in the loop. If user decides "no" at the decision box 913, he goes further through more URLs from the search result list via a block/step 915. If he/she has a plan to click any other URLs from the search result list at 915, and if user goes with yes, from there he goes back to the step 905 and repeats the operations in the loop, otherwise the user proceeds to the decision box 917. At a block/step 917 users decide whether or not to go with a new search string. If yes, the operation starts from a block/step 903 anew to repeats the operations in the loop, otherwise the user proceeds to perform the operation specified in the box/block/step 923. At the block/step 923, the user exits from logged session ending the search operation.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module may or may not modify the information of a signal and may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description, and can be apportioned and ordered in different ways in other embodiments within the scope of the teachings herein. Alternate boundaries and sequences can be defined so long as certain specified functions and relationships are appropriately performed/present. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. Although the Internet is taught herein, the Internet may be configured in one of many different manners, may contain many different types of equipment in different configurations, and may replaced or augmented with any network or communication protocol of any kind. Furthermore, client devices are often taught and depicted herein as laptop computers or personal computers (PCs), however, client devices can be cell phones, smart phones, palmtop computers, laptop computers, netbooks, mobile internet devices, point of sale devices, GPS systems, appliances, home security systems, DTVs, set top boxes, portable or fixed game consoles, workstations, supercomputers, other servers, personal device assistants (PDAs), or any other electronic device used by an end user.

One of average skill in the art will also recognize that the functional building blocks, and other illustrative blocks, modules and components herein, can be implemented as illustrated or by discrete components, application specific integrated circuits, processors executing appropriate software and the like or any combination thereof. The search results herein are taught as business, organizations, partnerships, stores, etc. It is important to not that when these terms are used, they can mean an individual (e.g., hairdresser, doctor, etc.), partnerships, incorporated business, government entity, foreign corporation, or any other form for conducting business, selling products, or providing services. Furthermore, the order of claimed steps and steps in methods may be changed. For example, it is largely taught herein that search results are first found by finding correlation to a search criteria or string and then limiting those search results by legitimacy tests or geography. There is nothing preventing this selection process from being done in reverse or another order, for example, all businesses in a geographic area may be found first, and they that list can be limited by applicability to the search criteria and by legitimacy, or via some other priority. Furthermore, the malware data 115 and malware detection module 117 along with other malware processing and system is show in FIG. 1 as residing within the client device 109, however, these modules and data could be duplicated or replaced with equivalent malware mechanisms placed within the search engine server 127 or other structures over the Internet. therefore, with the advent of network and cloud computing, options, hardware, software, and/or functions residing on a client device or server on the Internet may reside elsewhere over the Internet in the future, without departing from the spirit and scope of the teachings herein.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A computing device comprising:
   a malware report collection module that gathers and stores malware report data regarding Internet content from a plurality of client devices;
   a user interaction parameter receiver module that gathers and stores user interaction parameter data associated with the Internet content during the browsing of the Internet content from the plurality of client devices;
   a contact address correlation manager for computing a contact address correlation factor associated with the Internet content based on a correlation of an Internet content based first contact address with a company registrant database based second contact address;
   a web page quality factor computing module for computing a web page quality factor associated with the Internet content, wherein the computed malware report data, user interaction parameters, contact address correlation factor, and web page quality factor are collectively feedback factors; and
   circuitry for storing and processing a plurality of the feedback factors to allow the computing device to manage the Internet content based on the web page quality factor associated with the Internet content.

2. The computing device of claim 1 wherein the company registrant database is created by crawling a whois database and storing whois registration records of a plurality of business firms along with the malware report data, user interaction data, contact address correlation factor and at least one web page quality factor.

3. The computing device of claim 1 wherein the computing device is adapted to be coupled externally to a whois database server that requests that business firms update web page contents by communicating to the business firms based upon the feedback factors received from the computing device.

4. The computing device of claim 1, wherein the malware report collection module that gathers and stores malware report data regarding the Internet content from a plurality of client devices comprises a malware detection module on a client device that detects a presence of malware in the Internet content and generates a malware report that is communicated to the malware report collection module of the computing device along with a user notice regarding which particular type of malware is detected.

5. The computing device of claim 4, wherein:
the malware detection module responds to detecting the presence of malware in the Internet content by providing a warning to additional users, the warning including an indication of the type of malware detected; and
the malware report includes:
an indication of a detection of adware or spyware, and
a user-selected indication of the type of malware encountered.

6. The computing device of claim 4, wherein:
the user interaction parameter data comprises user interaction parameters regarding visit duration, duration between selections, link steps on a web page, specific item selection on a web page, "backward" command frequency, and "forward" command frequency; and
the computing device formulates an explicit web page rating based on a user selection, the user selection involving the user selecting various rating information and providing it to the computing device.

7. The computing device of claim 1, wherein:
the Internet content includes a web page; and
the contact address correlation manager of the computing device computes at least one contact address correlation factor using a web page based contact address and a whois database based contact address.

8. The computing device of claim 1, wherein the web page quality factor computing module computes the web page quality factor, wherein the web page quality factor computing module receives the malware report, user interaction parameters, and contact address correlation factor as inputs and computes the web page quality factor therefrom.

9. The computing device of claim 1, wherein:
a whois database server stores whois registration records of a plurality of business firms along with their feedback factors, and
the feedback factors are communicated from the computing device and augmented to respective records of at least one of the plurality of business firms.

10. The computing device of claim 1, wherein:
a whois database server contains contents augmented with feedback factors communicated from the computing device; and
the whois database server administrator requests at least one of a plurality of business firms to update their respective whois registration information and their respective web pages to improve the feedback factors.

11. The computing device of claim 1, wherein:
the contact address correlation manager computes the contact address correlation factor associated with the Internet content, and
the Internet content will be dropped from a search result list presented to the user if the contact address correlation factor associated with the Internet content is lower than a preset confidence level.

12. The computing device of claim 11, wherein:
the dropping out of Internet content associated with a poor contact address correlation factor from the search result list comprises identifying the Internet content as comprising an illegitimate site based on the contact address correlation factor associated with the Internet content being lower than a preset confidence level.

13. A method performed by a search engine server with feedback search information capability, the method comprising:
receiving a search string, a search category, and a search region;
in response to the receiving, providing an initial list of search results to a user via a client device, at least one of the search results comprising a web page;
responding to a selection of the web page by retrieving user interaction parameters from the client device for the currently selected web page, wherein the selection involves clicking a link associated with the at least one of the search results to open the selected web page;
retrieving a malware report from the client device for at least the selected web page;
computing a contact address correlation factor based on a correlation between first contact address information from the selected web page and registered company registrant database based second contact address information over the Internet; and
communicating one or more of the malware report, contact address correlation factor, and user interaction parameters to compute an Internet-based quality factor that is used to determine whether the at least one search result comprising the selected web page is included in a subsequent list of search results.

14. The method of claim 13, wherein:
the initial list of search results includes search results selected based on the search string, search category, and the search region, and
the list of search results is preprocessed prior to the providing, wherein preprocessing involves removing, from the list of search results, particular search results associated with an Internet-based quality factor having a value below a predetermined threshold.

15. The method of claim 13, wherein:
the search engine server retrieves user interaction parameters from the client device for the selected web page, and
a user interaction monitor communicates all the user interaction parameters on the selected web page to a web page quality factor computing module of the search engine server.

16. The method of claim 13, wherein:
the search engine server retrieves the malware report from the client device, and
a malware detection manager of the client device communicates the malware report to a web page quality factor computing module of the search engine server.

17. The method of claim 13, wherein a contact address correlation manager of the search engine server computes the contact address correlation factor by:
retrieving the first contact address information from the selected web page,
retrieving the registered second contact address information from an aggregate whois database, and computing a contact address correlation factor, based on a correlation between the first contact address information and the registered second contact address information, which is then input to a web page quality factor computing module.

18. The method of claim 13, wherein:

the Internet-based quality factor is a web page quality factor, a web page quality factor computing module computes the web page quality factor and communicates the web page quality factor in the reverse path of an Internet search operation, and computing the web page quality factor involves processing the database records corresponding to the selected web page with data stored in a whois database server.

19. The method of claim 13, wherein a negative malware report, contact address correlation factor, and user interaction parameters are communicated to a registered owner of the selected web page so that corrective measures may be taken.

* * * * *